(12) United States Patent
Cohen (10) Patent No.: US 9,020,177 B2
(45) Date of Patent: Apr. 28, 2015

(54) METHOD AND APPARATUS FOR CONSTRUCTION OF AN ACOUSTIC MODULE BACKVOLUME

(75) Inventor: Sawyer I. Cohen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 290 days.

(21) Appl. No.: 13/250,880

(22) Filed: Sep. 30, 2011

(65) Prior Publication Data

US 2013/0083954 A1   Apr. 4, 2013

(51) Int. Cl.
*H04R 1/02* (2006.01)
*B29C 49/06* (2006.01)
*H04R 1/28* (2006.01)
*H04R 31/00* (2006.01)

(52) U.S. Cl.
CPC ........... *B29C 49/06* (2013.01); *Y10T 29/49826* (2013.01); *Y10T 29/49993* (2013.01); *H04R 1/2803* (2013.01); *H04R 1/2857* (2013.01); *H04R 31/00* (2013.01); *H04R 2499/11* (2013.01)

(58) Field of Classification Search
USPC .................. 381/332–336, 345–351, 353–354
See application file for complete search history.

(56) References Cited

U.S. PATENT DOCUMENTS

| | | | | |
|---|---|---|---|---|
| 3,727,719 A * | 4/1973 | Yando | ............................ | 381/349 |
| 4,101,736 A * | 7/1978 | Czerwinski | .................... | 381/164 |
| 4,356,882 A * | 11/1982 | Allen | ............................ | 181/151 |
| 4,439,644 A * | 3/1984 | Bruney, III | ..................... | 381/349 |
| 4,657,108 A * | 4/1987 | Ward | ............................ | 181/151 |
| 5,287,412 A * | 2/1994 | Etzel et al. | ...................... | 381/86 |
| 6,338,395 B1 * | 1/2002 | Setiabudi et al. | ............. | 181/151 |
| 6,389,146 B1 * | 5/2002 | Croft, III | ....................... | 381/349 |
| 6,626,263 B2 * | 9/2003 | Sahyoun | ....................... | 381/349 |
| 6,658,129 B2 * | 12/2003 | D'Hoogh | ....................... | 381/349 |
| 7,454,025 B2 * | 11/2008 | Saiki | ............................ | 381/349 |
| 7,697,281 B2 | 4/2010 | Dabov et al. | | |
| 7,869,206 B2 | 1/2011 | Dabov et al. | | |
| 7,974,423 B2 * | 7/2011 | Matsumura et al. | .......... | 381/345 |
| 8,126,170 B2 | 2/2012 | Yeates et al. | | |
| 2008/0170141 A1 | 7/2008 | Tam et al. | | |
| 2008/0186397 A1 | 8/2008 | Kim | | |
| 2010/0013779 A1 | 1/2010 | Wu | | |
| 2010/0046771 A1 | 2/2010 | Gregg et al. | | |
| 2010/0061040 A1 | 3/2010 | Dabov et al. | | |
| 2010/0061055 A1 | 3/2010 | Dabov et al. | | |
| 2010/0146766 A1 | 6/2010 | Dabov et al. | | |
| 2011/0051360 A1 | 3/2011 | Dabov et al. | | |
| 2012/0121121 A1 | 5/2012 | Wilk | | |

FOREIGN PATENT DOCUMENTS

WO   WO 2008/088549   7/2008

OTHER PUBLICATIONS

"The World's Smallest Folded DSC Quality Camera Modules", www.idsimage.com/products.html, downloaded Jan. 28, 2012, 1 pg.
U.S. Appl. No. 13/436,924, entitled "Compact Portable Electronic Device Having Augmented Back Volume For Speaker", filed Mar. 31, 2012.

* cited by examiner

*Primary Examiner* — Suhan Ni
(74) *Attorney, Agent, or Firm* — Brownstein Hyatt Farber Schreck, LLP (57) ABSTRACT

Apparatus, systems and methods for providing a speaker with a backvolume that can be used in a portable electronic device are disclosed. The backvolume can be arranged to fit into a small, irregularly shaped space, thereby efficiently utilizing available space. In one embodiment, the backvolume can have a reduced wall thickness.

16 Claims, 9 Drawing Sheets

METHOD AND APPARATUS FOR CONSTRUCTION OF AN ACOUSTIC MODULE BACKVOLUME

BACKGROUND OF THE INVENTION

Space within devices, e.g., compact mobile electronic devices, is often as a premium. For example, in a handheld electronic device, such as a cellular phone or a digital music player, the amount of space available to house a speaker with a backvolume may be limited.

As will be appreciated by those skilled in the art, a backvolume is included in an acoustic module or speaker arrangement, and includes sealed air trapped substantially behind a diaphragm. The size of a backvolume has a direct affect on the natural frequency of an acoustic module. In general, a larger backvolume, or a backvolume that traps a relatively large volume of air, has a lower natural frequency and a fuller sound than a smaller backvolume, or a backvolume that traps a relatively small volume of air.

A backvolume is typically sealed to a speaker box of an acoustic module or speaker arrangement. For example, a backvolume may be enclosed in a box that is sealed against a speaker box such that a minimal amount of air leaks from the backvolume. Increasing the size of a backvolume of an acoustic module, or increasing an air volume associated with a backvolume, lowers the natural frequency of the acoustic module and improves the fullness of the sound produced by the acoustic module. However, as space available in a small mobile device in which an acoustic module is contained is often relatively limited, it is generally difficult to increase the size of a backvolume.

A backvolume may be enclosed in an injection molded box formed from a plastic material. Although the size of a backvolume may be increased by decreasing the thickness of an injection molded box that encloses the backvolume, decreasing the thickness of an injection molded box may adversely affect the structural integrity of the injection molded box and, thus, cause the injection molded box to lose its shape. Additionally, an injection molding process may be compromised due to the difficulties associated with flowing a material into a mold arranged to create a relatively thin box. A thinner injection molded box may be at risk of cracking, and may be difficult to seal to a speaker box. Further, not all shapes may be injection molded and, as such, may utilize complex sealed joints which require extra wall thickness, and may have yield and reliability risk.

Therefore, there is a need for constructing an enclosure for a backvolume of an acoustic module or speaker arrangement that substantially enlarges available volume of the backvolume in compact mobile electronic devices without compromising the integrity of the acoustic module or speaker arrangement.

SUMMARY

The present invention relates generally to constructing a speaker with a backvolume that can be used in a portable electronic device. The backvolume can be arranged to fit into a small, irregularly shaped space. In one embodiment, the backvolume can have a reduced wall thickness.

The present invention may be implemented in numerous ways, including, but not limited to including, as a method, system, device, or apparatus (including computer readable medium, e.g., that contains instructions that allowing a computing system to operate mechanical equipment to forms a speaker arrangement). Several embodiments of the present invention are discussed below.

According to one aspect, a speaker arrangement that can be arranged to be included in a small mobile electronic device includes a driver, a first section, and a second section. The first section being formed from a non-compliant material using an injection molding process, and the driver is located within the first section. The second section is coupled to the first section and is formed from a compliant material. Additionally, the second section is configured to define a backvolume. In one embodiment, the second section can be filled with a material arranged to provide structure to the second section. In another embodiment, the second section can be filled with a low-density foam.

In accordance with another aspect, a method for forming an acoustic module that includes a first portion arranged to contain a driver and the second portion arranged to contain a backvolume can include obtaining a preform or parison, forming the first portion using an injection molding process on the blank, and forming the second portion using a blow molding process on the blank after the first portion is formed. The blow molding process shapes the second portion such that the backvolume can be contained within the second portion.

According to yet another aspect, a method for forming an acoustic module that can include a first portion arranged to contain a driver and a second portion arranged to contain a backvolume. The method can include obtaining the first portion, obtaining the second portion, and joining the first portion and the second portion to create an interface. The first portion can be non-compliant and formed from a first material using an injection molding process. The second portion can be compliant and formed from a second material. In one embodiment, the first material is plastic and the second material is silicone, rubber, or silicone rubber. In another embodiment, the second portion can be at least partially filled with either a foamed ceramic or a foamed polystyrene.

According to still another aspect, a speaker arrangement having a backvolume according to one embodiment can include a backvolume structure. The backvolume structure can contain the backvolume. At least a portion of the backvolume structure can be formed and then filled with a material to provide structure to the at least the portion of the backvolume structure formed.

Other aspects and advantages will become apparent from the following detailed description taken in conjunction with the accompanying drawings which illustrate, by way of example, the principles of the present invention.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations associated with the specification.

DETAILED DESCRIPTION OF EXAMPLE EMBODIMENTS

Embodiments of the invention pertains to apparatus, systems and methods for providing a speaker with a backvolume that can be used in a portable electronic device. The backvolume can be arranged to fit into a small, irregularly shaped space, thereby efficiently utilizing available space. In one embodiment, the backvolume can have a reduced wall thickness.

Space within devices such as compact mobile electronic devices, e.g., cell phones or digital music players, is often limited. As devices become smaller, the space available within devices to house the various components of the devices is also becoming smaller. Often, available space in a device may be defined between and around components of a device and, thus, may have relatively irregular boundaries, e.g., a substantially jagged outline.

When an acoustic module or speaker arrangement is to within a space having an irregularly shaped boundary, the ability to construct a portion of the speaker arrangement that contains a backvolume such that the amount of space occupied by the portion is substantially maximized generally increases the air volume of the backvolume and, thus, decreases the natural frequency associated with the speaker arrangement. As a result, a fuller sound may be provided by the speaker arrangement.

In one embodiment, a speaker arrangement is formed such that a portion of the speaker arrangement that contains a backvolume has relatively thin walls and a substantially jagged outline or footprint. The relatively thin walls may have a thickness of approximately 0.2 millimeters (mm). The portion of a speaker arrangement that is arranged to contain a backvolume may be formed using a blow molding process such that the portion of the speaker arrangement that is arranged to contain the backvolume is integrally formed as a substantially continuous piece with a portion of the speaker arrangement that is arranged to contain components of the speaker arrangement, e.g., a driver. Alternatively, the portion of a speaker arrangement may be formed from a compliant material that may be bonded to a portion of the speaker arrangement that is arranged to contain components of the speaker arrangement. To improve the structure of a portion of a speaker arrangement that is arranged to contain a backvolume, a foam may be injected into the backvolume.

Figure 1:
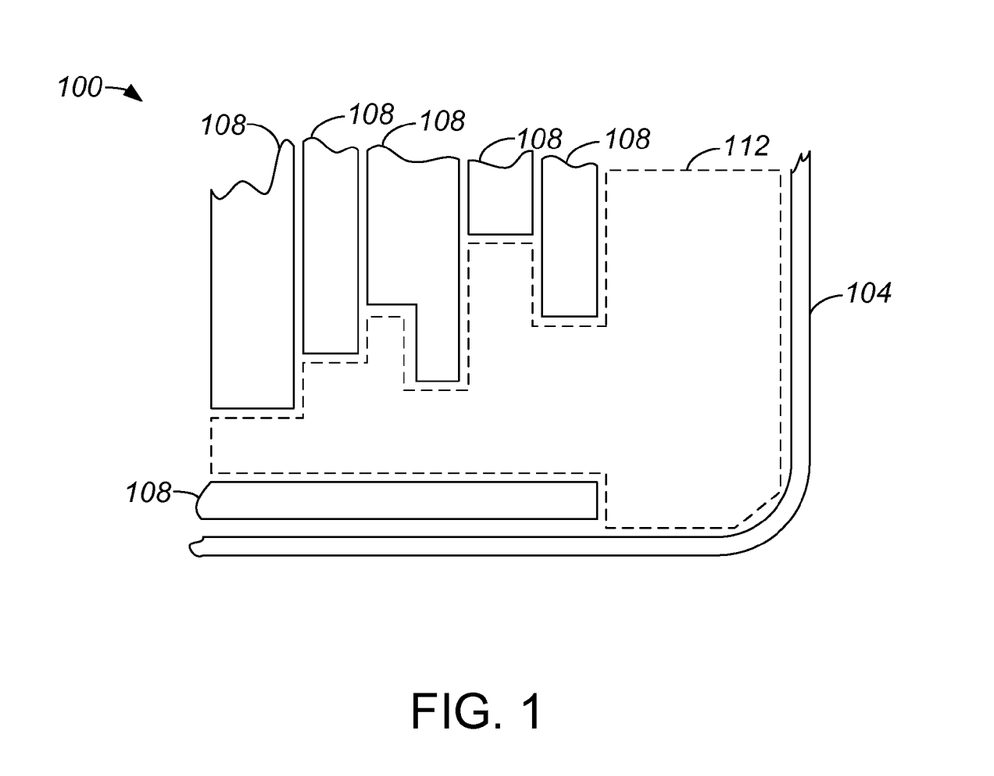
FIG. 1 is a diagrammatic representation of a portion of a device in which an acoustic module or a speaker arrangement is to be positioned in accordance with one embodiment.

Referring initially to FIG. 1, a small mobile electronic device that includes an irregularly shaped space, e.g., a space that includes multiple edges and corners, in which an acoustic module or a speaker arrangement is to be positioned will be described in accordance with one embodiment. A portion of a small mobile electronic device 100 includes a housing 104 that is arranged to contain various components and/or features 108 of device 100. Components and/or features 108 may include, but are not limited to including, electronic components and/or mechanical components. Device 100 may be, but is not limited to being, a cellular phone, a tablet computer, a digital media player, a handheld gaming system, or a personal digital assistant. In general, device 100 may be any suitable device that utilizes an acoustic module or a speaker arrangement.

As overall space within device 100 may be at a premium, a space 112 is effectively defined to include substantially empty areas between components and/or features 108. That is, space 112 is arranged to include substantially empty zones between components and/or features 108. Thus, space 112 may be defined substantially within a relatively jagged overall boundary, e.g., an overall boundary that includes multiple edges and corners, as shown. A jagged overall boundary generally includes undercuts.

Figure 2:
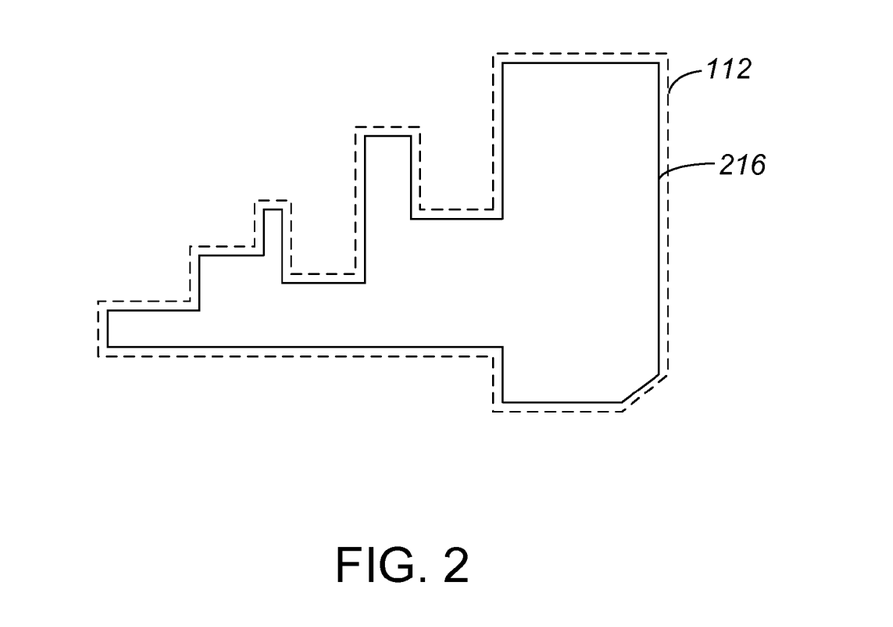
FIG. 2 is a diagrammatic representation of an area, e.g., area 112 of FIG. 1, in which an acoustic module or a speaker arrangement is positioned in accordance with one embodiment.

To substantially maximize the volume associated with a backvolume, a speaker arrangement (not shown) may be configured to effectively fill space 112. By way of example, a speaker arrangement (not shown) may be shaped such that at least a backvolume of the speaker arrangement has a shape that effectively follows the contours of the overall boundary of space 112. In addition, the thickness of walls that enclose the backvolume of a speaker arrangement (not shown) may be relatively thin to further substantially maximize the volume associated with the backvolume. As shown in FIG. 2, an acoustic module or speaker arrangement 216, which may have a relatively thin wall thickness, may have a footprint that follows the overall boundary of space 112 such that speaker arrangement 216 fits relatively tightly within space 112. A substantially minimum distance between the outline of element 216 and the outline of space 112 may be as small as approximately 0.1 millimeters (mm). The thickness of walls that contain a backvolume of speaker arrangement 216 may be approximately 0.2 mm to 0.3 mm, or more.

A speaker arrangement 216 that has a backvolume with a shape which includes multiple edges and corners, and/or relatively thin walls configured to contain the backvolume, may be formed using an overall process that includes an injection molding process and an injection blow molding process. In one embodiment, an injection molding process may be used to form details on a portion of a speaker arrangement that houses a driver, while a blow molding process is used to form a portion of the speaker arrangement that contains a backvolume.

Figure 3:
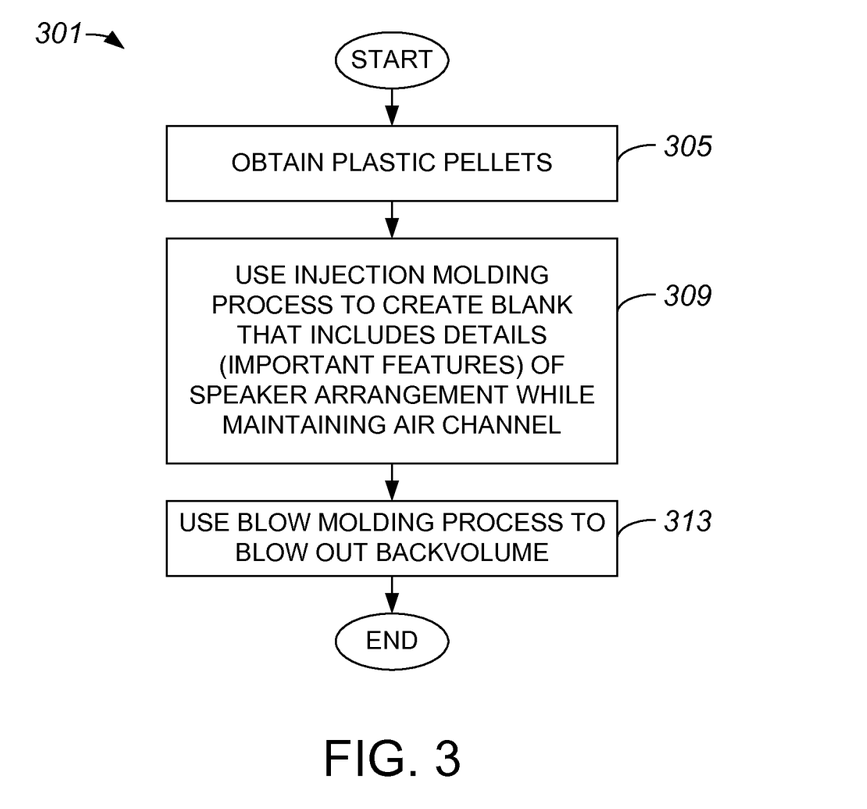
FIG. 3 is a process flow diagram which illustrates a method of forming a speaker arrangement that includes a blow molding process used to form a backvolume portion of the speaker arrangement in accordance with one embodiment.

FIG. 3 is a process flow diagram which illustrates a method of forming a speaker arrangement that includes a blow molding process used to form a backvolume portion of the speaker arrangement in accordance with one embodiment. A method 301 of forming a speaker arrangement begins at step 305 in which pellets, e.g., pellets formed from plastic, is obtained. As will be appreciated by those skilled in the art, pellets may be considered to be material that serves as a starting point for a molding process.

After the pellets are obtained, an injection molding process is used to create a blank, e.g., a preform or a parison, in step 309. The preform or parison includes details, as for example important features, of a speaker arrangement in step 309. The preform or parison may be considered to be a starting point for a blow expansion process. In one embodiment, details of the speaker arrangement are created with respect to a portion of the speaker arrangement that generally encapsulates or houses a driver, and other components, of the speaker arrangement.

It should be appreciated that an injection molding process may generally include, but is not limited to including, feeding the plastic pellets into a heated barrel and forcing the melted blank into a mold cavity that defines details. As the melted pellets are cooled in the mold cavity, the piece, i.e., the piece formed from the melted pellets, effectively takes to the configuration of the mold cavity. In one embodiment, the injection molding process is such that an air channel may be created and maintained in the piece.

Once details of the speaker arrangement are created, a blow molding or blow forming process is used in step 313 to create a backvolume. In other words, a blow molding process is used to form an enclosure that contains a backvolume. It should be appreciated that a blow molding process may involve heating up the portion of the piece that is to be blow molded, and then blowing or pumping air into the portion. The details of the speaker arrangement may effectively be held or gripped to support the piece while a portion of the piece is blown into a mold cavity such that the injection molded portion and the blow molded portion are integrally formed. Typically, substantially only a portion of the piece that is configured to contain the backvolume is subject to blow molding, while the portion of the piece that is configured to house components of the speaker arrangement are not subject to blow molding. The method of forming a speaker arrangement is completed upon blowing out the backvolume.

Figure 4:
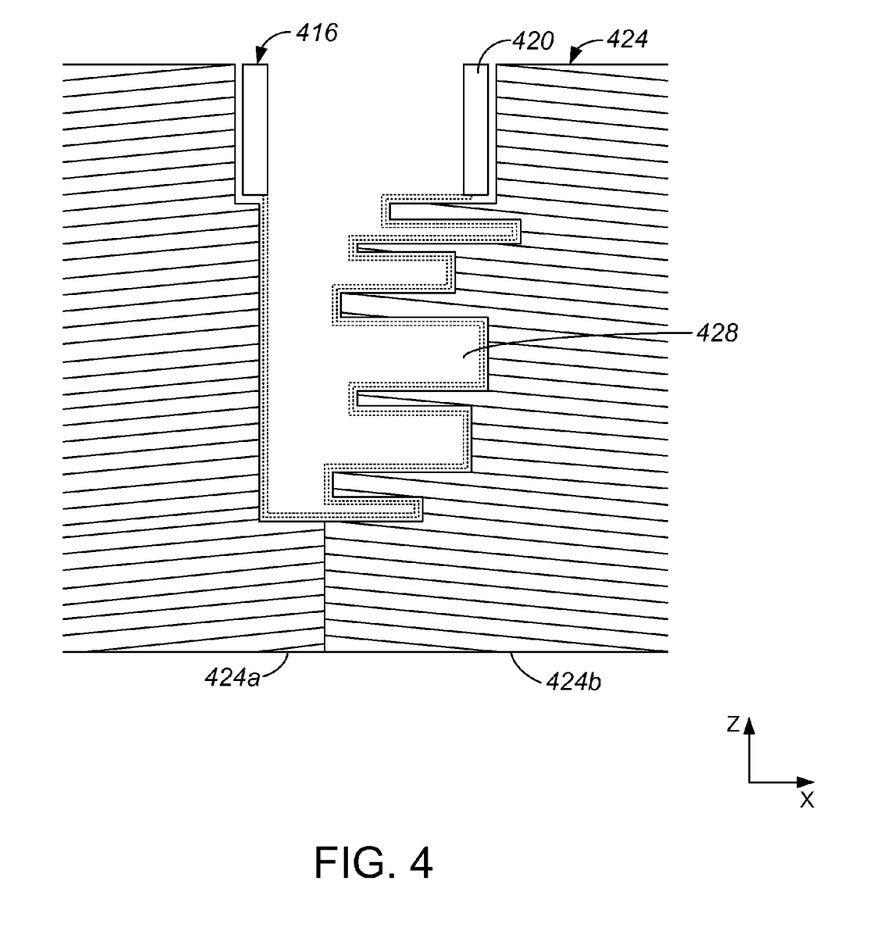
FIG. 4 is a diagrammatic cross-sectional side-view representation of a speaker arrangement with a backvolume formed using a blow molding process in accordance with one embodiment.

With reference to FIG. 4, a mold that may be used to support a piece during a blow molding process will be described in accordance with one embodiment. FIG. 4 is a diagrammatic cross-sectional side-view representation of a speaker arrangement formed with a backvolume formed within a mold cavity using a blow molding process. A speaker arrangement 416 includes an injection molded portion 420 and a blow molded portion 428 that are integrally formed. In general, injection molded portion 420 includes details of speaker arrangement 416, and is arranged to contain components of speaker arrangement 416. Blow molded portion 428 may be considered to be a backvolume portion of speaker arrangement 416, as blow molded portion 428 is arranged to contain a backvolume portion of speaker arrangement 416.

A mold 424 includes at least two sides 424a, 424b that are arranged to cooperate to define a mold cavity that allows blow molded portion 428 to be formed. Sides 424a, 424b include multiple edges and borders. Mold 424 may hold or otherwise grasp speaker arrangement 416 at injection molded portion 420 while air is blown into speaker arrangement 416 such that blow molded portion 428 is effectively molded to the contours of mold 424. After blow molded portion 428 is formed, mold 424 may effectively be opened such that speaker arrangement 416 may be removed.

Figure 5:
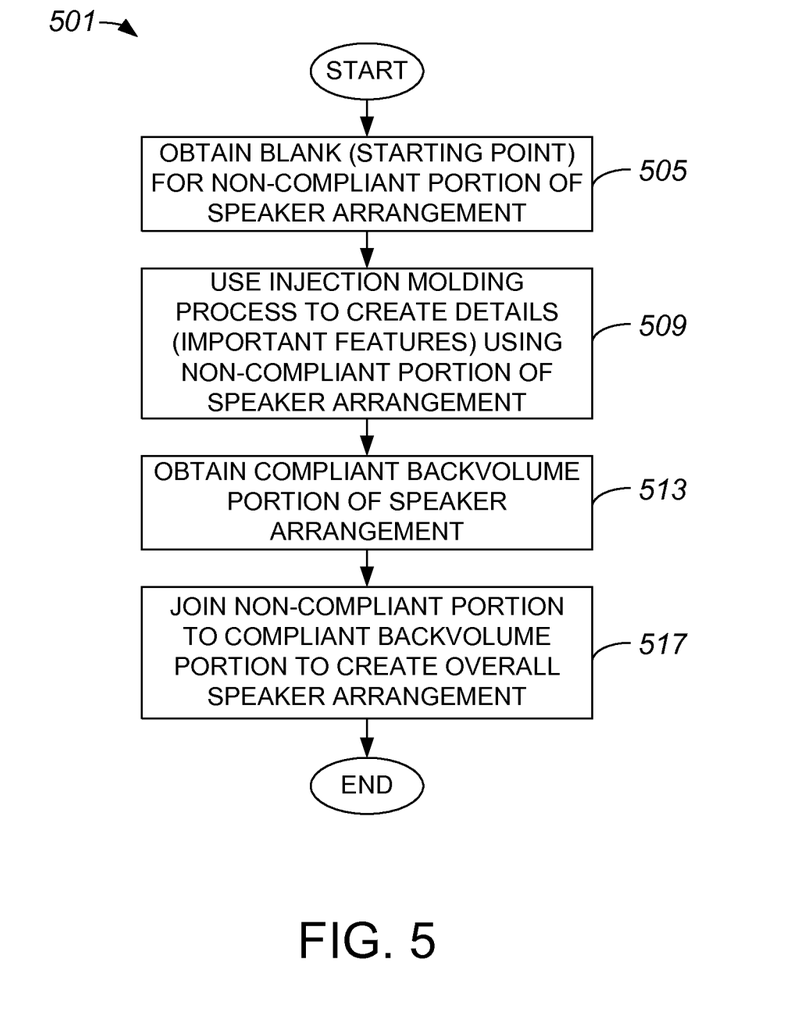
FIG. 5 is a process flow diagram which illustrates a method of forming a speaker arrangement that includes joining a non-compliant portion with a compliant backvolume portion in accordance with one embodiment.

A speaker arrangement that has a backvolume with a shape which includes multiple edges and corners, and/or relatively thin walls configured to contain the backvolume, is not limited to being formed using an overall process that includes an injection molding process and an injection blow molding process. Alternatively, a speaker arrangement may be formed by effectively joining a non-compliant injection molded portion with a compliant portion that is configured to contain a backvolume. FIG. 5 is a process flow diagram which illustrates a method of forming a speaker arrangement that includes joining a non-compliant portion with a compliant backvolume portion in accordance with an embodiment of the present invention. A process of forming a speaker arrangement begins at step 505 in which a blank, or a starting point, is obtained such that a non-compliant portion of the speaker arrangement may be formed. As discussed above, a blank, e.g., a preform or a parison, may be created by substantially melting plastic pellets. After obtaining the blank, an injection molding process is implemented in step 509 to create details, e.g., important features, of the non-compliant portion of the speaker arrangement. The non-compliant portion of the speaker arrangement is generally arranged to encapsulate or house components of the speaker arrangement. Although the non-compliant portion of the speaker arrangement may be formed from any suitable non-compliant material, the non-compliant portion is often formed from plastic.

In step 513, a compliant portion of the speaker arrangement is obtained. The compliant portion is a backvolume portion of the speaker arrangement, i.e., a portion of the speaker arrangement that is arranged to contain the backvolume. The compliant portion may generally be formed from any suitable compliant material including, but not limited to including, rubber, silicone, and silicone rubber. The thickness of the compliant portion may be relatively thin, as for example as low as approximately 0.2 mm.

Once the compliant portion of the speaker arrangement is obtained, the non-compliant portion and the compliant portion are joined to create an overall speaker arrangement in step 517. The compliant portion may effectively be stretched such that part of the compliant portion overlaps part of the non-compliant portion, and the compliant portion may be joined to the non-compliant portion. In one embodiment, the compliant portion may be joined to the non-compliant portion using an adhesive arranged to seal the compliant portion to the non-compliant portion. In another embodiment, the compliant portion may be joined to the non-compliant portion using a mechanical fastener such as a metal ring, a metal clip, or a gasket. After the compliant portion and the non-compliant portion are joined, the process of forming a speaker arrangement is completed. One embodiment of a speaker arrangement in which portions are joined will be described below with reference to FIG. 11.

Figure 6:
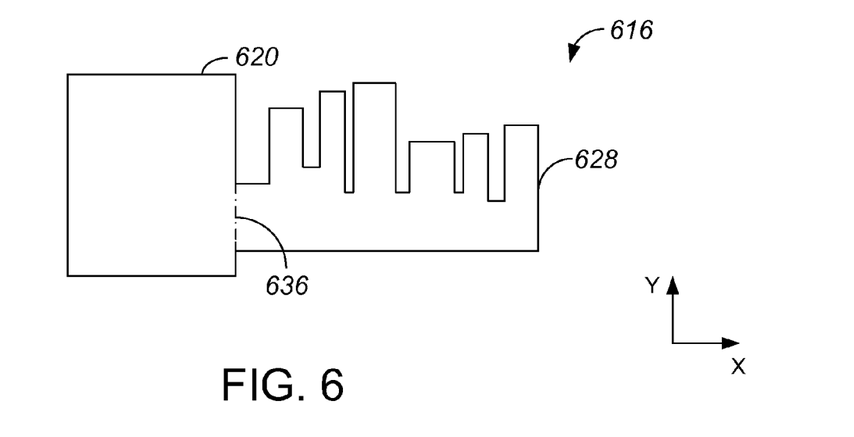
FIG. 6 is a diagrammatic side-view representation of a speaker arrangement that includes a non-compliant portion that is joined to a compliant backvolume portion in accordance with one embodiment.

Referring next to FIG. 6, a speaker arrangement that includes a non-complaint portion that is joined to a compliant portion will be described in accordance with an embodiment of the present invention. FIG. 6 is a diagrammatic side-view representation of a speaker arrangement. A speaker arrangement 616 includes a non-compliant portion 620 arranged to contain components (not shown), e.g., electronic and mechanical components. Non-complaint portion 620 may be formed from a plastic material using an injection molding process Speaker arrangement 616 also includes a compliant portion 628 arranged to contain a backvolume. Compliant portion 528, which may be formed from rubber, silicone, or silicone rubber, may have a wall thickness that is relatively thin, e.g., a wall thickness that may be as thin as approximately 0.2 mm. Compliant portion 528 is joined or substantially bonded to non-compliant portion 620 such that an interface 636 is formed.

Figure 7:
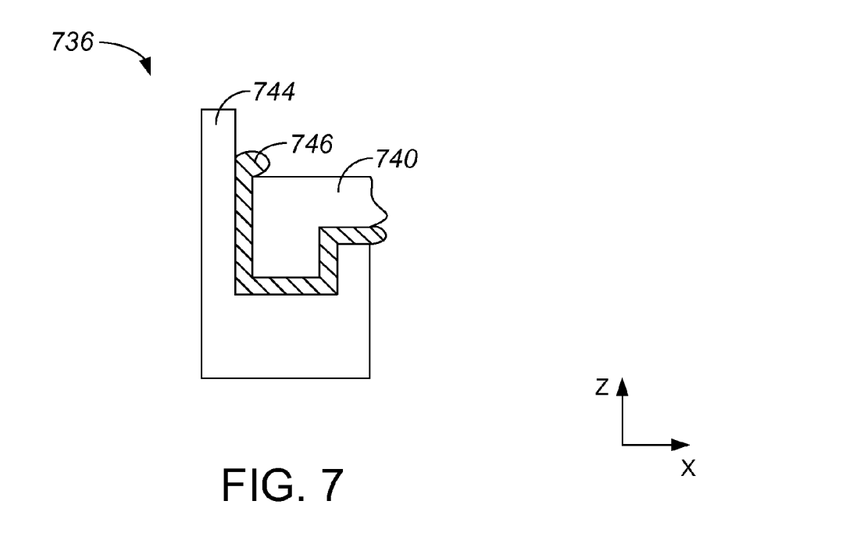
FIG. 7 is a diagrammatic representation of a junction suitable for use in joining a non-compliant portion of a speaker arrangement with a compliant portion of the speaker arrangement in accordance with one embodiment.

Interface 636 is generally a junction between compliant portion 528 and non-compliant portion 620. Areas of compliant portion 528 and non-compliant portion 620 may be configured to facilitate the creation of interface 636. FIG. 7 is a diagrammatic representation of a junction suitable for use in joining a non-compliant portion of a speaker arrangement with a compliant portion of the speaker arrangement in accordance with an embodiment of the present invention. A junction or interface 736 may include a relatively rigid connector part 744 that is a part of a non-compliant portion of a speaker arrangement and a relatively non-rigid connector part 740 that is part of a compliant portion of the speaker arrangement.

In one embodiment, part 740 is stretched such that it may engage part 744. Once engaged, adhesive 746 may be applied to effectively bond part 740 to part 744. Although adhesive 746 is shown as being arranged to secure part 740 to part 744, part 740 is not limited to being secured to par 740 using adhesive 746. For example, as mentioned above, a mechanical fastener (not shown) may be used in addition to, or instead of, adhesive 746.

The structural strength of a portion of a speaker arrangement that is arranged to contain a backvolume and has a relatively thin wall thickness may be enhanced with the addition of a structural component inside the backvolume. For example, a structural component may be provided within a backvolume to improve the structural strength of the backvolume portion of a speaker arrangement. In one embodiment, a portion of a speaker arrangement that is arranged to contain a backvolume may be at least partially filled with a relatively stiff, acoustically transparent material to provide structure to the portion. The material that is used to at least partially fill the portion may be a foam, e.g., foamed ceramic or foamed polystyrene.

Figure 8:
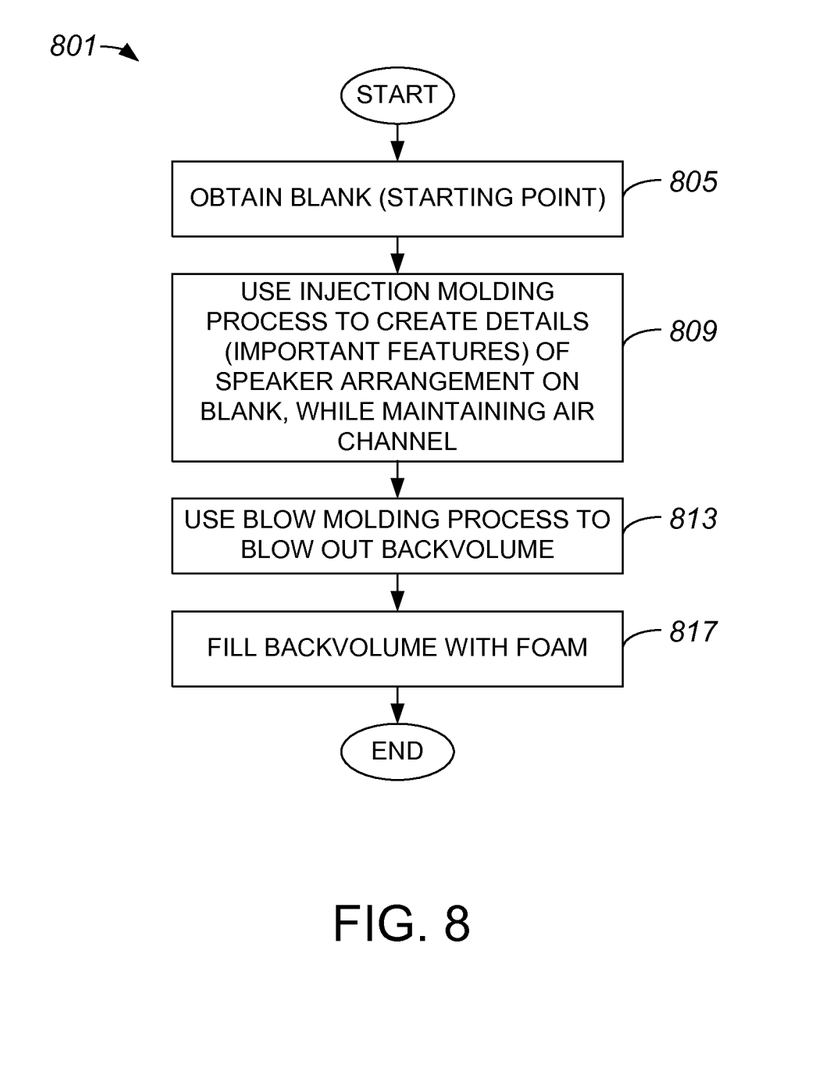
FIG. 8 is a process flow diagram which illustrates a first method of forming a speaker arrangement in which a backvolume portion of the speaker arrangement is filled with foam in accordance with one embodiment.

With reference to FIG. 7, first method of forming a speaker arrangement in which a backvolume portion of the speaker arrangement, formed using a blow molding process, is filled with foam will be described in accordance with an embodiment of the present invention. A method 801 of forming a speaker arrangement begins at step 805 in which a blank, or a starting point, is obtained. As previously mentioned, a starting point may involve plastic pellets. An injection molding process is used to create details, as for example important features, of a speaker arrangement using the blank in step 809. In one embodiment, details of the speaker arrangement are created with respect to a portion of the speaker arrangement that generally encapsulates or houses a driver, and other components, of the speaker arrangement.

After details of the speaker arrangement are created, a blow molding or blow forming process is used in step 813 to create a backvolume portion. Then, in step 817, the backvolume is at least partially filled with foam. The amount of foam used to at least partially fill the backvolume may vary depending upon facts which include, but are not limited to including, the density of the foam, the size of the backvolume, and the thickness of the walls of the portion of the speaker arrangement that contains the backvolume. In general, the amount of foam used to at least partially fill the backvolume may be such that desired acoustical qualities may be achieved. It should be appreciated that the amount of foam added to at least partially fill a backvolume is generally sufficient to provide structural strength without causing the walls of the portion of the speaker arrangement that contains the backvolume to expand outwards. That is, the amount of foam is generally sufficient to provide structure to maintain the shape of the backvolume. The method of forming a speaker arrangement is completed upon at least partially filling the backvolume with foam.

Figure 9:
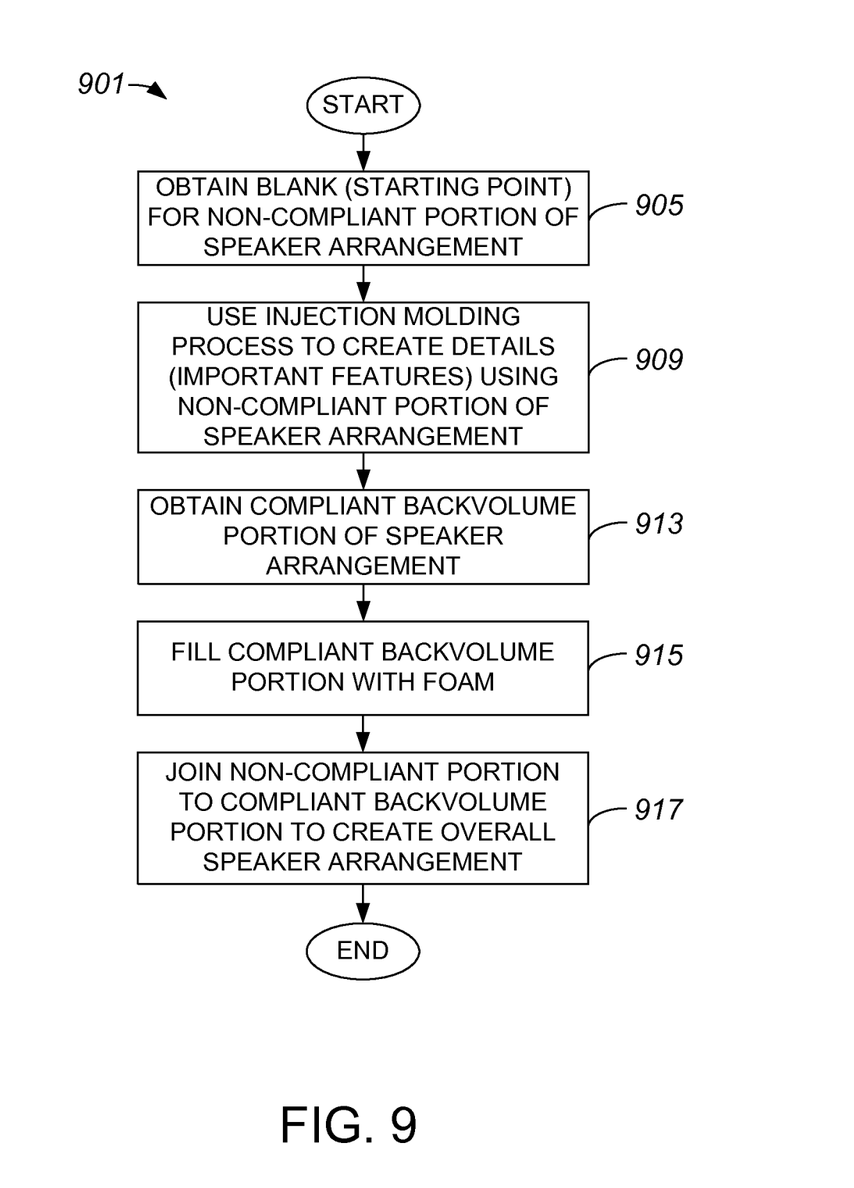
FIG. 9 is a process flow diagram which illustrates a second method of forming a speaker arrangement in which a backvolume portion of the speaker arrangement is filled with foam in accordance with one embodiment.

FIG. 9 is a process flow diagram which illustrates a second method of forming a speaker arrangement in which a backvolume portion of the speaker arrangement, in which the backvolume portion is formed from a compliant material, is filled with foam in accordance with an embodiment of the present invention. A process of forming a speaker arrangement begins at step 905 in which a blank, or a starting point, is obtained such that a non-compliant portion of the speaker arrangement may be formed. After obtaining the blank, an injection molding process is implemented to create details, e.g., important features, of the non-compliant portion of the speaker arrangement in step 909.

A compliant portion of the speaker arrangement, or the portion of the speaker arrangement that is arranged to contain the backvolume, is obtained in step 913. The compliant portion may generally be formed from any suitable compliant material including, but not limited to including, rubber, silicone, and silicone rubber. Once the compliant portion of the speaker arrangement is obtained, the backvolume is at least partially filled with foam to provide structure to the compliant portion in step 915. The foam may be, but is not limited to being, foamed ceramic and foamed polystyrene.

After the backvolume is at least partially filled with foam, the non-compliant portion and the compliant portion are joined to create an overall speaker arrangement in step 917. The process of forming a speaker arrangement is completed upon joining the compliant portion and the non-compliant portion.

Figure 10:
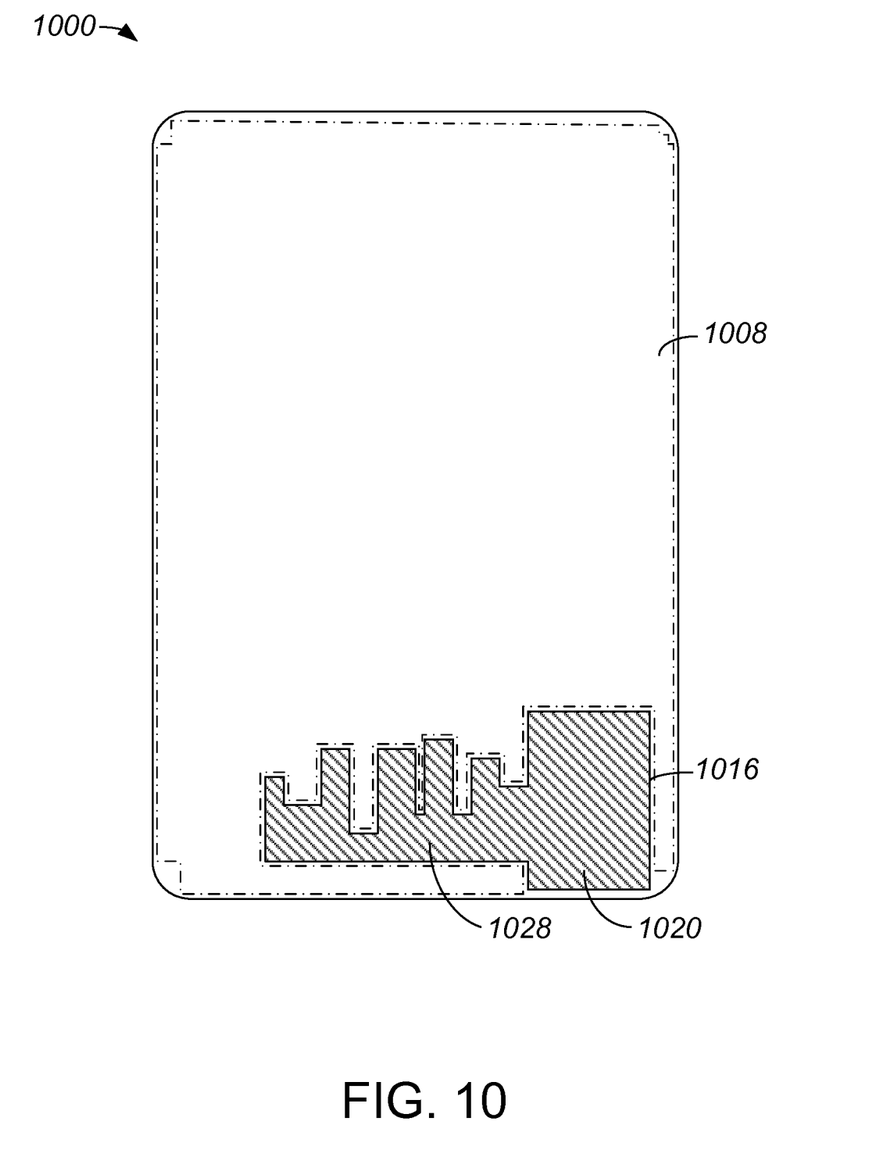
FIG. 10 is a diagrammatic representation of a small mobile electronic device in which a speaker arrangement is installed in accordance with one embodiment.

As discussed above, an acoustic module or speaker arrangement may be a component in a small mobile electronic device. That is, a speaker arrangement that includes a backvolume portion which has a relatively jagged shape and/or is relatively thin-walled is suitable for use in a small mobile electronic device in which space is limited. FIG. 10 is a diagrammatic representation of a small mobile electronic device in which a speaker arrangement is installed in accordance with an embodiment of the present invention. A small mobile electronic device 1000 includes a populated area 1008 in which components (not shown), e.g., electronic and/or mechanical components, are located. A speaker arrangement 1016 with a first portion 1020, e.g., a non-compliant portion, and a second portion 1028, e.g., a compliant portion, having multiple corners and edges is arranged to fit in a space that is at least partially defined by area 1008. Second portion 1028 is arranged to contain a backvolume of speaker arrangement 1016, and is shaped to follow the boundaries substantially defined by area 1008. As shown, the shape of second portion 1028 is such that the volume of a backvolume contained within second portion 1028 may be substantially maximized within constraints, as for example space constraints, imposed within device 1000.

Figure 11:
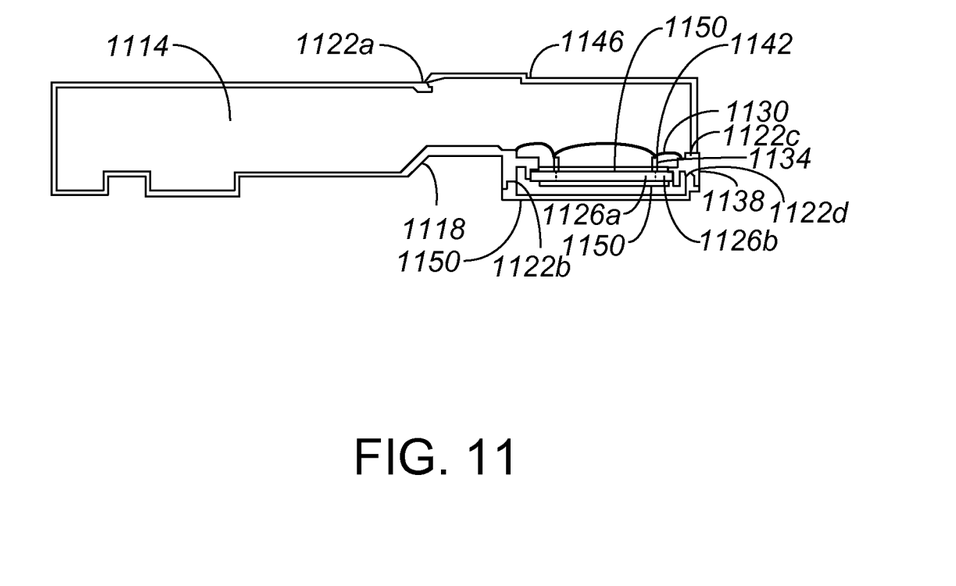
FIG. 11 is a diagrammatic side-view representation of a speaker arrangement in which a non-compliant portion of the speaker arrangement is joined to a compliant portion of the speaker arrangement in accordance with an embodiment.

FIG. 11 is a diagrammatic cross-sectional side-view representation of a speaker arrangement in which a non-compliant portion of the speaker arrangement is joined to a compliant portion of the speaker arrangement in accordance with an embodiment. It should be appreciated that the speaker arrangement of claim 11 has not been drawn to scale. A backvolume area 1114 includes undercuts and is substantially enclosed by a first frame 1118. The undercuts included in backvolume area 1114 may be created in first frame 1118 using a blow molding process. First frame 1118 and a second frame 1138 are substantially coupled by a top piece 1146 and a bottom piece 1150. Top piece 1146 and bottom piece 1150 effectively enclose components of a speaker including, but not limited to including, a center magnet 1126a, an outer magnet 1126*b*, yokes 1150, at least one voice coil 1142, and a diaphragm 1130. In general, top piece 1146 and bottom piece 1150 enclose a "diaphragm area." Frames 1118, 1138 are joined to top piece 1146 and bottom piece 1150, in one embodiment, using ultrasonic weld joints 1122*a-d*.

Although only a few embodiments of the present invention have been described, it should be understood that the present invention may be embodied in many other specific forms without departing from the spirit or the scope of the present invention. By way of example, an acoustic module or speaker arrangement has been describe as including a non-compliant portion and a compliant portion. In general, a non-compliant portion may be formed from any material that is less compliant than a material used to from a compliant portion. Alternatively, a compliant portion may be formed from any material that is more compliant than a material used to form a non-compliant portion. That is, a non-compliant portion is generally less compliant than a compliant portion, while a compliant portion is generally more compliant than a non-compliant portion. In one embodiment, both a non-compliant portion and a compliant portion may be formed from a plastic material, with the non-compliant portion having thicker walls than the compliant portion such that the non-compliant portion is less compliant than the compliant portion. The compliant portion may be relatively rigid, but may be less rigid than the non-compliant portion.

While a portion of a speaker arrangement that is non-compliant and/or houses components of the speaker arrangement has generally been described as being formed from plastic using an injection molding process, it should be appreciated that the portion of a speaker arrangement that is non-compliant and/or houses components of the speaker arrangement is not limited to being formed from plastic or formed using an injection molding process. In one embodiment, a portion of a speaker arrangement that is arranged to house components of a speaker arrangement may be formed from plastic onto which rubber is overmolded.

In general, the steps associated with the methods described herein may vary widely. Steps may be added, removed, altered, combined, and reordered without departing from the spirit or the scope of the present invention. By way of example, as will be appreciated by those skilled in the art, the formation of an acoustic module or a speaker arrangement may generally include, but is not limited to including, positioning a driver within a non-compliant portion of the speaker arrangement and installing a diaphragm.

The various aspects, features, embodiments or implementations of the invention described above may be used alone or in various combinations.

While this specification contains many specifics, these should not be construed as limitations on the scope of the disclosure or of what may be claimed, but rather as descriptions of features specific to particular embodiment of the disclosure. Certain features that are described in the context of separate embodiments may also be implemented in combination. Conversely, various features that are described in the context of a single embodiment may also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

In one embodiment, the components, process steps, and/or data structures may be implemented using various types of operating systems, computing platforms, computer programs, and/or general purpose machines, e.g., injection molding and blow molding machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

While embodiments and applications have been shown and described, it would be apparent to those skilled in the art having the benefit of this disclosure that many more modifications than mentioned above are possible without departing from the inventive concepts herein.

What is claimed is:

1. A speaker arrangement, the speaker arrangement comprising:
   a driver;
   a first section, the first section being formed from a non-compliant material using an injection molding process, wherein the driver is located within the first section; and
   a second section, the second section being distinct from the first section and coupled to the first section to form a substantially single, continuous piece, the second section being formed from a compliant material, wherein the second section is configured to define a backvolume.

2. The speaker arrangement of claim 1 wherein the second section is formed using a blow molding process.

3. The speaker arrangement of claim 2 wherein the second section is at least partially filled with a material arranged to provide structure to the second section.

4. The speaker arrangement of claim 2 wherein the second section is at least partially filled with foam.

5. The speaker arrangement of claim 4 wherein the foam is a low-density foam arranged to provide structure to the second section.

6. The speaker arrangement of claim 1 wherein the second section is integrally formed with the first section.

7. The speaker arrangement of claim 1 wherein the first section is separately formed from the second section, and wherein the first section is joined to the second section.

8. The speaker arrangement of claim 7 wherein the non-compliant material is a plastic material and the compliant material is a rubber material.

9. The speaker arrangement of claim 7 wherein the second section is at least partially filled with a material arranged to provide structure to the second section.

10. The speaker arrangement of claim 7 wherein the second section is at least partially filled with foam.

11. The speaker arrangement of claim 10 wherein the foam is a low-density foam arranged to provide structure to the second section.

12. The speaker arrangement of claim 1, wherein the second section is formed with a distinct shape, the shape dependent on at least one component of an electronic device positioned adjacent the second section.

13. The speaker arrangement of claim 12, wherein the electronic device comprises one of a cellular phone or a tablet computer.

14. A speaker arrangement having a backvolume, the speaker arrangement comprising:
    a backvolume structure containing the backvolume, the backvolume structure distinct from and coupled to a first structure including a driver of the speaker arrangement to form a substantially single, continuous piece, wherein at least a portion of the backvolume structure being formed and then filled with a material to provide structure to the at least the portion of the backvolume structure formed.

15. The speaker arrangement of claim 14 wherein the at least a portion of the backvolume structure is formed by blow molding.

16. The speaker arrangement of claim 14 wherein the speaker arrangement comprises: an interface structure for coupling to the at least a portion of the backvolume, the interface structure being formed by an injection molding process.

* * * * *